United States Patent [19]
Yamamoto et al.

[11] Patent Number: 5,159,019
[45] Date of Patent: Oct. 27, 1992

[54] SLIDING MATERIAL COMPOSITION

[75] Inventors: Yoshihisa Yamamoto; Tuyoshi Miyamori; Kazuo Ishiwari, all of Osaka, Japan

[73] Assignee: Daikin Industries Ltd., Osaka, Japan

[21] Appl. No.: 710,395

[22] Filed: Jun. 5, 1991

[30] Foreign Application Priority Data

Jun. 8, 1990 [JP] Japan ............... 2-151357

[51] Int. Cl.$^5$ ............... C08L 83/00; C08L 67/02
[52] U.S. Cl. ............... 525/189
[58] Field of Search ............... 525/189

[56] References Cited

U.S. PATENT DOCUMENTS

| | | | |
|---|---|---|---|
| 4,703,076 | 10/1987 | Mori | 524/420 |
| 4,847,135 | 7/1989 | Braus et al. | 428/138 |
| 4,897,439 | 1/1990 | Rau et al. | 524/404 |
| 5,006,594 | 4/1991 | Rees | 524/520 |

FOREIGN PATENT DOCUMENTS

| | | |
|---|---|---|
| 106764 | 4/1984 | European Pat. Off. . |
| 0232922 | 8/1987 | European Pat. Off. . |
| 52-73275 | 6/1977 | Japan . |
| 1548045 | 7/1979 | United Kingdom . |
| 2139235 | 11/1984 | United Kingdom . |
| 2177099 | 1/1987 | United Kingdom . |

OTHER PUBLICATIONS

ASTM D-1457-83; Standard Specification for PTFE Molding and Extrusion Materials; p. 633.

*Primary Examiner*—Melvyn I. Marquis
*Assistant Examiner*—Helen F. Lee
*Attorney, Agent, or Firm*—Birch, Stewart, Kolasch & Birch

[57] ABSTRACT

A sliding material composition comprising (a) 100 parts by weight of polyphenylene sulfide and (b) 5 to 100 parts by weight of a resin mixture of 10 to 90% by weight of a melt processable fluorine-containing resin and 90 to 10% by weight of polytetrafluoroethylene, which has good abrasion resistance and lubricating properties without the deterioration of impact strength.

3 Claims, No Drawings

SLIDING MATERIAL COMPOSITION

BACKGROUND OF THE INVENTION

1. Field of the Invention

The present invention relates to a sliding material composition. In particular, the present invention relates to a sliding material composition comprising a polyphenylene sulfide resin, a melt processable fluorine-containing resin and polytetrafluoroethylene.

Such a composition provides a heat-resistant plastic sliding material which can be injection molded so as to improve productivity.

2. Description of the Related Art

Recently, a large amount of heat-resistant plastic materials have been used as materials of sliding parts such as a bearing. Many of such materials are compositions comprising a heat-resistant base resin in which powdery polytetrafluoroethylene (hereinafter referred to as "PTFE") or an inorganic solid lubricant,(e.g. molybdenum disulfide or graphite) is used as a filler in order to impart abrasion resistance or a lubricating property to the resin.

The abrasion resistance and lubricating properties which are imparted by the addition of PTFE most effectively contribute to a decrease in the friction coefficient. Then, PTFE is used as an additive filler to many heat-resistant resins.

As the base resin of the sliding material composition, polyphenylene sulfide (hereinafter referred to as "PPS") is widely used because of its good heat resistance, stiffness, moldability, chemical resistance, etc. A composition of PPS to which PTFE is added to impart abrasion resistance and the sliding property is widely used as a heat-resistant material (see Japanese Patent Kokai Publication No. 73275/1977).

However, the addition of only the solid lubricants including PTFE cannot sufficiently improve abrasion characteristics, and the PPS composition containing the solid composition can only be used at a low speed under low load. Further, since the addition of PTFE will decrease mechanical strength such as impact resistance, the composition finds limited applications.

Accordingly, it is desirable to provide a sliding material composition comprising PPS with good abrasion resistance and also good mechanical strength including impact strength.

In general, to improve impact strength of a resin, a flexible polymer is blended with the resin. However, when an elastomer, for example, is blended with the resin, abrasion characteristics and lubricating properties deteriorate and no desirable composition is achieved.

SUMMARY OF THE INVENTION

One object of the present invention is to provide a material which can prevent decrease of impact resistance of a PPS composition caused by the addition of PTFE while preventing deterioration of the abrasion resistance and the sliding property imparted by PTFE.

Another object of the present invention is to provide a sliding material composition comprising PPS and PTFE which has good impact resistance.

According to the present invention, there is provided a sliding material composition comprising (a) 100 parts by weight of PPS, (b) 5 to 100 parts by weight of a resin mixture of 10 to 90 % by weight of a melt processable fluorine-containing resin and 90 to 10 % by weight of PTFE.

DETAILED DESCRIPTION OF THE INVENTION

In the composition of the present invention, if an amount of the melt processable fluorine-containing resin or PTFE in the mixture (b) is less than 10% by weight or larger than 90% by weight, the mechanical properties such as impact strength greatly deteriorate.

When the amount of the mixture (b) is less than 5 parts by weight per 100 parts by weight of PPS, the abrasion resistance and the sliding property are not sufficiently improved. When this amount exceeds 100 parts by weight, inherent properties of PPS such as heat resistance and stiffness may deteriorate.

Specific examples of the melt processable fluorine-containing resin are tetrafluoroethylene/perfluoroalkyl vinyl ether copolymers (hereinafter referred to as "PFA"), tetrafluoroethylene/hexafluoropropylene copolymers (hereinafter referred to as "FEP"), tetrafluoroethylene/hexafluoropropylene/perfluoroalkyl referred to as "EPE"), ethylene/tetrafluoroethylene copolymers (hereinafter referred to as "ETFE"), polyvinylidene fluoride (hereinafter referred to as "PVDF"), polychlorotrifluoroethylene (hereinafter referred to as "PCTFE") and the like. Among them, PFA and ETFE are preferred.

In general, PFA is a copolymer of tetrafluoroethylene and at least one fluoroalkyl vinyl ether of the formula:

$$CF_2=CF-O-R_f \qquad (I)$$

wherein $R_f$ is a fluoroalkyl group having 1 to 10 carbon atoms, preferably perfluoroalkyl group. Preferably, PFA comprises 99.5 to 92 % by weight of tetrafluoroethylene and 0.5 to 8% by weight of the fluoroalkyl vinyl ether.

Preferably, FEP comprises 96 to 87% by weight of tetrafluoroethylene and 4 to 13% by weight of hexafluoropropylene, and ETFE comprises 90 to 74% by weight of tetrafluoroethylene and 10 to 26% by weight of ethylene.

The melt processable fluorine-containing resin may comprise at least one other monomer in such amount that the inherent properties of the resin are not deteriorated. Examples of the other monomer are tetrafluoroethylene (in the case of the resins other than PFA and FEP), hexafluorovinyl propylene (in the case of the resins other than FEP), perfluoroalkyl vinyl ether (in the case of the resins other than PFA), perfluoro(C$_1$-C$_{10}$-alkylethylene), perfluoro(C$_1$-C$_{10}$alkylallyl ether), and a compound of the formula:

$$CF_2=CF-[OCF_2CFX(CF_2)_m]_n-OCF_2(CF_2)_p-Y \qquad (II)$$

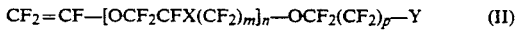

wherein X is a fluorine atom or a trifluoromethyl group, Y is a halogen atom (e.g. fluorine, chlorine, bromine or iodine), m is 0 or 1 provided that when m is 1 (one), X is a fluorine atom, n is a number of 0 to 5, and p is a number of 0 to 2.

PTFE to be used in the present invention is in a powder form having an average particle size of 30 μm or less and may be PTFE powder which is usually used to impart the sliding property. In the present invention, PTFE includes not only homopolymer of tetrafluoroethylene but also a copolymer of tetrafluoroethylene and 1.0% by weight or less of at least one copolymerizable monomer.

PPS to be used in the present invention may be uncured or partially cured polyphenylene sulfide resin or mixtures thereof as well as their modified products. Examples of commercially available PPS are PPS sold by Polyplastics under the trade name "FORTRON", and PPS sold by Phillips Petroleum Co., Ltd. under the trade name of "RYTON".

To the composition of the present invention, at least one additive such as an inorganic or organic reinforcing material or other solid lubricant may be added so long as the objects of the present invention are not impaired.

In order to increase the mechanical properties of the composition of the present invention, various fillers can be added. Examples of the fillers which can be used in the present invention are glass fibers, asbestos fibers, silica fibers, silica-alumina fibers, alumina fibers, zirconia fibers, potassium titanate whiskers, polyamide fibers, phenol resin fibers, silica, talc, clay, mica, calcium carbonate, barium sulfate, titanium oxide, silicon nitride and the like.

The resin composition of the present invention may be prepared by a known mixing process.

For example, the components are mixed with a twin-cylinder mixer, a tumbling mixer, a Henschel mixer and the like and then further mixed and pelletized with a melt kneading apparatus such as a twin-screw extruder.

In the preparation, all the components are mixed simultaneously, though PTFE and the melt processable fluorine-containing resin may be first kneaded and pelletized, and then kneaded with PPS.

The pellets are molded to produce an article of a desired shape using a molding machine which is used for molding a thermoplastic resin such as an injection molding machine, a compression molding machine, an extruder and the like.

PREFERRED EMBODIMENTS OF THE INVENTION

The present invention will be illustrated by the following Examples.

The resin compositions prepared in Examples are evaluated by the following test methods:

(1) Abrasion and wearing test

By using a Suzuki-Matsubara type abrasion machine (manufactured by Orientec Co., Ltd.) and S45C having a surface roughness $R_a$ of 0.1 to 0.3 μm as an opposite material, the abrasion and wearing test is carried out under the following conditions:

i) Coefficient of dynamic friction

Measured at a surface pressure of 10 kg/cm$^2$ and a sliding speed of 0.3 m/sec.

ii) Wear factor

After carrying the test at a surface pressure of 10 kg/cm$^2$ and a sliding speed of 0.3 m/sec., a decreased amount of the sample is measured and a wear factor is calculated according to the following equation:

$$\text{Wear factor (mm}^3\text{/kg} \cdot \text{km)} = \frac{\text{Worn amount}}{\text{Sliding distance} \times \text{Contact area} \times \text{Density}}$$

(2) Izod impact test

By using a U-F impact test machine (manufactured by Ueshima Manufacturing Co., Ltd.), notched Izod impact strength is measured according to ASTM D256.

(3) Tensile test

By using a Tensilon universal test machine (manufactured by Orientec Co., Ltd.), tensile strength at break is measured according to ASTM D638 at room temperature at a drawing rate of 5 mm/min.

EXAMPLES 1-5

In a Henschel mixer, tetrafluoroethylene/perfluoroalkyl vinyl ether) copolymer powder (Neoflon PFA, AP-210 manufactured by Daikin Industries, Ltd.) and PTFE powder (Lublon L-5F having an average particle size of 5 μm manufactured by Daikin Industries, Ltd.) were homogeneously mixed in amounts shown in the Table, and then melt mixed and pelletized by an extruder having a screw diameter of 50 mm at a cylinder temperature of 380° C.

Then, the pellets and a polyphenylene sulfide resin (FORTRON 1140-A1 containing 66.7 parts by weight of glass fibers per 100 parts of the polyphenylene sulfide resin, manufactured by Polyplastics Co., Ltd.) were mixed in a tumbling mixer in a ratio shown in the Table. Thereafter, the mixture was melt mixed and pelletized by a different direction type twin screw extruder at 340° to 380° C. to produce molding pellets.

The produced pellets were charged in an injection molding machine (cylinder temperature: 340° to 380° C., mold temperature: 140° C.) and each test piece was injection molded.

With the molded test piece, each property was measured by the above described method. The results are shown in the Table.

EXAMPLE 6

In the same manner as in Examples 1 to 5 but mixing the PFA powder and the PTFE powder with the polyphenylene sulfide resin in a ratio of the Table and mixing and pelletizing them simultaneously by the twin screw extruder at 340° to 380° C., a test piece was produced and its properties were measured. The results are shown in the Table.

EXAMPLE 7

In the same manner as in Examples 1 to 5 but using a tetrafluoroethylene/hexafluoropropylene copolymer powder (Neoflon FEP, NP-20 manufactured by Daikin Industries, Ltd.) in place of the PFA powder, a test piece was produced and its properties were measured. The results are shown in the Table.

EXAMPLE 8

In the same manner as in Examples 1 to 5 but using a tetrafluoroethylene/ethylene copolymer powder (Neoflon ETFE, EP-521 manufactured by Daikin Industries, Ltd.) in place of the PFA powder and changing an extrusion temperature to 320° C. and a cylinder temperature for molding to 280° to 290° C., a test piece was produced and its properties were measured. The results are shown in the Table.

EXAMPLE 9

In the same manner as in Examples 1 to 5 but using a polyvinylidene fluoride powder (Neoflon VDF, VP-850 manufactured by Daikin Industries, Ltd.) in place of the PFA powder and changing an extrusion temperature to 300° C. and a cylinder temperature for molding to 280° to 290° C., a test piece was produced and its properties were measured. The results are shown in the Table.

ative Example 3), but the Izod impact strength was greatly decreased and the tensile strength was also decreased.

In the Table, "parts" and "%" are by weight.

TABLE

| | Example No. | | | | | |
|---|---|---|---|---|---|---|
| | 1 | 2 | 3 | 4 | 5 | 6 |
| PPS (parts) | 100 | 100 | 100 | 100 | 100 | 100 |
| Glass fiber (parts) | 66.7 | 66.7 | 66.7 | 66.7 | 66.7 | 66.7 |
| PTFE/melt processable F-cont. resin (parts) | 41.6 | 41.6 | 41.6 | 71.4 | 18.5 | 41.6 |
| Kind of melt processable F-cont. resin | PFA | PFA | PFA | PFA | PFA | PFA |
| Ratio: | | | | | | |
| PTFE (%) | 50 | 30 | 70 | 50 | 50 | 50 |
| Melt processable F-cont. resin (%) | 50 | 70 | 30 | 50 | 50 | 50 |
| Coefficient of dynamic friction | 0.40 | 0.34 | 0.50 | 0.33 | 0.41 | 0.39 |
| Wear factor ($mm^3/kg \cdot km$) | $1.4 \times 10^{-2}$ | $1.6 \times 10^{-2}$ | $4.6 \times 10^{-2}$ | $3.2 \times 10^{-2}$ | $1.6 \times 10^{-2}$ | $5.0 \times 10^{-2}$ |
| Notched Izod impact strength (kg · cm/cm) | 9.9 | 8.3 | 7.2 | 9.0 | 9.5 | 6.8 |
| Tensile strength ($kg/cm^2$) | 1320 | 1310 | 1280 | 1200 | 1590 | 1100 |

| | Example No. | | | | | |
|---|---|---|---|---|---|---|
| | 7 | 8 | 9 | Comp. 1 | Comp. 2 | Comp. 3 |
| PPS (parts) | 100 | 100 | 100 | 100 | 100 | 100 |
| Glass fiber (parts) | 66.7 | 66.7 | 66.7 | 66.7 | 66.7 | 66.7 |
| PTFE/melt processable F-cont. resin (parts) | 41.6 | 41.6 | 41.6 | 41.6 | 41.6 | 0 |
| Kind of melt processable F-cont. resin | FEP | ETFE | PVDF | — | PFA | — |
| Ratio: | | | | | | |
| PTFE (%) | 50 | 50 | 50 | 100 | 0 | 0 |
| Melt processable F-cont. resin (%) | 50 | 50 | 50 | 0 | 100 | 0 |
| Coefficient of dynamic friction | 0.39 | 0.40 | 0.41 | 0.42 | 0.46 | 0.48 |
| Wear factor ($mm^3/kg \cdot km$) | $1.8 \times 10^{-2}$ | $2.9 \times 10^{-2}$ | $4.3 \times 10^{-2}$ | $5.9 \times 10^{-2}$ | $2.3 \times 10^{-2}$ | $54.5 \times 10^{-2}$ |
| Notched Izod impact strength (kg · cm/cm) | 9.5 | 9.4 | 9.7 | 5.9 | 6.0 | 8.8 |
| Tensile strength ($kg/cm^2$) | 1200 | 1360 | 1400 | 1130 | 1110 | 1890 |

COMPARATIVE EXAMPLES 1, 2 and 3

The same polyphenylene sulfide resin as used in Examples 1 to 5 was mixed with PTFE or PFA in a ratio shown in the Table and then pelletized by the twin screw extruder and injection molded in the same manner as in Examples 1 to 5 to produce a test piece. The properties of the test piece were measured by the above methods. The results are shown in the Table.

As seen from the results of the Table, the composition of the present invention has a smaller coefficient of dynamic friction and a smaller wear factor which are required for the sliding material, while there is no great decrease of the Izod impact strength and tensile strength. In Examples 1, 4, 5 and 7 to 9, the Izod impact strength was increased.

As understood from the results of the Table for Comparative Examples, the addition of only PTFE (Comparative Example 1) or only PFA (Comparative Example 2) reduced the wear factor in comparison with the PPS resin containing neither PTFE nor PFA (Compar-

What is claimed is:

1. A sliding material composition comprising
   (a) 100 parts by weight of polyphenylene sulfide
   (b) 5 to 100 parts by weight of a resin mixture of 10 to 90% by weight of a melt processable fluorine-containing resin and 90 to 10% by weight of polytetrafluoroethylene.

2. The sliding material composition according to claim 1, wherein said melt processable fluorine-containing resin is selected from the group consisting of tetrafluoroethylene/perfluoroalkyl vinyl ether copolymers, tetrafluoroethylene/hexafluoropropylene copolymers, tetrafluoroethylene/hexafluoropropylene/perfluoroalkyl vinyl ether copolymers, ethylene/tetrafluoroethylene copolymers, polyvinylidene fluoride and polychlorotrifluoroethylene.

3. The sliding material composition according to claim 1, wherein polytetrafluoroethylene is a powder having an average particle size of not larger than 30 μm.

* * * * *